(12) United States Patent
Uno et al.

(10) Patent No.: US 7,285,194 B2
(45) Date of Patent: Oct. 23, 2007

(54) CONDUCTIVE DIAMOND ELECTRODE AND PROCESS FOR PRODUCING THE SAME

(75) Inventors: Masaharu Uno, Fujisawa (JP); Yoshinori Nishiki, Fujisawa (JP); Tsuneto Furuta, Fujisawa (JP); Miho Ohashi, Fujisawa (JP); Tetsuro Tojo, Osaka (JP); Hitoshi Takebayashi, Osaka (JP); Tateki Kurosu, Hiratsuka (JP)

(73) Assignees: Permelec Electrode Ltd., Kanagawa (JP); Toyo Tanso Co., Ltd., Osaka (JP)

( * ) Notice: Subject to any disclaimer, the term of this patent is extended or adjusted under 35 U.S.C. 154(b) by 0 days.

(21) Appl. No.: 11/220,685

(22) Filed: Sep. 8, 2005

(65) Prior Publication Data
US 2006/0066203 A1   Mar. 30, 2006

(30) Foreign Application Priority Data
Sep. 28, 2004  (JP)  ............ P. 2004-281887

(51) Int. Cl.
*C25B 11/12* (2006.01)
(52) U.S. Cl. .............. 204/294; 205/350; 205/357; 205/359; 205/555; 205/556; 204/290.01; 204/290.15

(58) Field of Classification Search ............ 204/294, 204/290.01, 290.15; 205/350, 357, 359, 205/555, 556
See application file for complete search history.

(56) References Cited

U.S. PATENT DOCUMENTS
2003/0064225 A1 *  4/2003  Ohashi et al. ............ 428/408

FOREIGN PATENT DOCUMENTS
EP   1 568 798 A2   8/2005
RU   2 149 831 C1   5/2000

OTHER PUBLICATIONS

Heidi B. Martin et al., "Voltammetry Studies of Single-Crystal and Polycrystalline Diamond Electrodes" (1999), Journal of The Electrochemical Society, vol. 146, No. 8, pp. 2959-2964, no month available.

(Continued)

*Primary Examiner*—Bruce F. Bell
(74) *Attorney, Agent, or Firm*—Sughrue Mion, PLLC

(57) ABSTRACT

A conductive diamond electrode including a conductive substrate comprising a carbonaceous material, a conductive diamond catalyst layer formed on a surface of the conductive substrate, and a carbon fluoride formed on an exposed portion present on the surface of the conductive substrate. The formed carbon fluoride prevents the conductive substrate from contacting with an electrolytic solution, thereby suppressing corrosion of the substrate. A long life of the electrode can be attained.

2 Claims, 1 Drawing Sheet

OTHER PUBLICATIONS

G. Sine et al., "Electrochemical Behavior of Fluorinated Boron-Doped Diamond" (2003), Electrochemical and Solid-State Letters, vol. 6, No. 9, pp. D9-D11, no month available.

Tzu-Chi Kuo et al., "Electrochemical Modification of Boron-Doped Chemical Vapor Deposited Diamond Surfaces with Covalently Bonded Monolayers" (1999), Electrochemical and Solid-State Letters, vol. 2, No. 6, pp. 288-290, no month available.

Sergio Ferro et al., "Physicochemical Properties of Fluorinated Diamond Electrodes" (2003), J. Phys. Chem. B., vol. 107, pp. 7567-7573, no month available.

Sergio Ferro et al., "The 5-V Window of Polarizability of Fluorinated Diamond Electrodes in Aqueous Solutions" (2003), Anal. Chem., vol. 75, pp. 7040-7042, no month available.

Patent Abstracts of Japan (JP-A-60-005010) Arakawa Tatsumi, "Preparation of Carbon Fluoride", no month/year available.

European Search Report dated Jan. 10, 2006.

* cited by examiner

CONDUCTIVE DIAMOND ELECTRODE AND PROCESS FOR PRODUCING THE SAME

FIELD OF THE INVENTION

The present invention relates to a conductive diamond electrode for industrial use and a process for producing the same. More particularly, the present invention relates to a conductive diamond electrode for electrolysis that efficiently performs decomposition of substances contained in drinking water, industrial waste water or the like, adversely affecting human bodies and environment, and synthesis of peroxosulfuric acid, peroxocarbonic acid or the like, and has industrial durability, and a process for producing the same.

BACKGROUND ART

Electrochemical process can control a reaction by changing electric current or voltage, and enables oxidation reaction and reduction reaction to conduct at separate place. Thus, the electrochemical process is a basic technology widely used in electrolytic soda process, electroplating, metal collection or the like.

It is known that when an aqueous solution is electrolyzed, oxidizing agents such as oxygen, chlorine, ozone, hydrogen peroxide, or the like can generate, and active species such as OH radicals also partially generate. In water treatment field such as cleaning, sterilization or waste water treatment, electrochemical process utilizing those oxidizing agents is getting to be employed. In particular, in water treatment field, the electrochemical process is not always required to use medicines, and is therefore noted as a clean technology that can achieve the objective treatment with only electric energy.

Thus, the electrochemical process is put to practical use. However, life of an electrode is not sufficient depending on the purpose of use, and this disturbs spread of the process. It is also pointed out that depending on the purpose of use, the objective reaction does not proceed sufficiently. When an aqueous solution is electrolyzed, discharge reaction of water easily proceeds, and the objective reaction proceeds slowly, resulting in decrease in energy efficiency. Cases have frequently occurred that electrochemical reaction cannot be applied from the economic standpoint.

Conventional electrodes for electrolysis include lead oxide, tin oxide, platinum, DSE (Dimensionally Stable Electrode), graphite and amorphous carbon. Graphite or amorphous carbon material has conventionally been used as an electrode material. However, those are consumable materials, and show remarkable consumption in anodic polarization. It is known that lead oxide and tin oxide also consume in anodic polarization.

Platinum and DSE are called an insoluble electrode. Valve metal such as titanium, having high corrosion resistance at anodic polarization, and its alloy are used as an electrode substrate of such an insoluble electrode. Noble metals such as platinum or iridium, having high corrosion resistance, and their oxides are used as an electrode catalyst. However, it is known that even where those expensive corrosion-resistant materials are used, a substrate corrodes according to current density and current-carrying time when electric current is applied, and an electrode catalyst gradually consumes. Thus, an electrode having further excellent durability is demanded.

Diamond has excellent thermal conductivity, optical transmission and durability against high temperature and oxidation, and in particular can control electric conductivity by doping. Therefore, diamond is considered to have great potential as semiconductor device or energy conversion element.

Swain et al. reported that conductive diamond has stability as an electrode catalyst for electrolysis in an acidic solution, and suggested that diamond is far superior to other carbon material (*Journal of Electrochemical Society*, Vol. 141, 3382 (1994)). JP-A-7-299467 proposes a treatment method of organic substances in a waste liquid by oxidation decomposition using a conductive diamond electrode having conductive diamond as an electrode catalyst. JP-A-2000-226682 proposes a method of electrochemically treating organic substances, in which conductive diamond is used as an anode and also a cathode. JP-A-11-269685 proposes an electrochemical synthesis method of ozone using a conductive diamond electrode as an anode. JP-A-2001-192874 proposes synthesis of peroxosulfuric acid using a conductive diamond electrode as an anode.

From such researches, a conductive diamond is noted as an electrode catalyst from the standpoints of corrosion resistance and efficiency. It is expected that when an electrochemical process using a conductive diamond electrode is employed, decomposition efficiency of organic substances or synthesis efficiency of useful oxides such as peroxosulfuric acid is improved, as compared with the case of using the conventional electrode.

To use a conductive diamond as an electrode for electrolysis, a substrate to maintain a structure as an electrode and also to supply sufficient electric current is required. Therefore, it is necessary to constitute an electrode by depositing a conductive diamond on such a substrate. Hot filament CVD (Chemical Vapor Deposition) method, microwave plasma CVD method, plasma arc jet method, PVD (Physical Vapor Deposition) method and the like are developed as a synthesis method of conductive diamond. In CVD synthesis method which is the general production process of a conductive diamond, an electrode is exposed to hydrogen atmosphere at high temperature of 750-950° C. For this reason, it is essential or desirable that the electrode substrate is thermally and chemically stable, is difficult to undergo hydrogen brittleness, and has a coefficient of thermal expansion close to that of diamond. Non-metal materials such as silicon, silicon carbide, graphite or amorphous carbon, and metal materials such as titanium, niobium, zirconium, tantalum, molybdenum or tungsten are reported as a substrate for a conductive diamond electrode satisfying those requirements. Silicon or niobium is put into practical use from the standpoint of corrosion resistance.

Recently, with progress of applied researches of a conductive diamond into various electrochemical processes, it has been revealed that even a conductive diamond electrode having a substrate comprising silicon or niobium does not have industrially sufficient durability depending on the applied uses. As a result of investigations of this cause, it has been confirmed that an electrolytic solution impregnates into defective portions such as pinholes or cracks, present in a diamond catalyst layer, a substrate corrodes, and peeling of the diamond catalyst layer proceeds with the corrosion. Those defective portions unavoidably generate by scattering or ununiformity of a diamond synthesis step to corrode a substrate, thereby shortening a life of electrode. For this reason, a substrate overcoming those disadvantages and having further improved corrosion resistance is demanded.

As described above, it is considered that an electrolytic solution impregnates into a diamond catalyst layer from defective portions such as pinholes, unavoidably generated therein, a substrate corrodes, and as a result, peeling of the diamond catalyst layer proceeds. From this standpoint, it is essential to prevent corrosion of a substrate in order to provide a stable electrode.

A method of forming an oxide layer on a surface of a substrate for the purpose of improving adhesion between an electrode catalyst and a substrate and also protecting a substrate itself is disclosed as a basic life-prolonging method of DSE in an oxide electrolytic cell (JP-A-57-192281). However, even where such an oxide interlayer is formed on the surface of a substrate for a conductive diamond electrode, the most part of the oxide interlayer is reduced by hydrogen radicals or the like under CVD diamond synthesis conditions. As a result, in many cases, the objective functions of adhesion improvement of the electrode catalyst and corrosion resistance improvement of the substrate are not exhibited.

Conventionally, rapid voltage rise called anode effect is frequently observed in electrolysis of a molten salt containing a fluorine compound, using a carbonaceous material Such as graphite or amorphous carbon as an anode. It is confirmed that the cause of this phenomenon is that fluorinated graphite is formed on the surface of an electrode, thereby inhibiting wettability between an electrode and an electrolytic solution (*Fluorine Chemistry and Industry*, Kagaku Kogyo Sha).

Regarding influence of a conductive diamond to a diamond catalyst layer by fluorination treatment, Sine et al. confirm that when plasma fluorination treatment is applied to a conductive diamond electrode having a substrate comprising monocrystal silicon, the diamond catalyst layer is fluorinated, and report that regarding its electrochemical properties, oxygen generation overvoltage at anodic polarization is the same as that of the conductive diamond electrode before fluorination treatment, but hydrogen generation overvoltage at cathodic polarization increases (*Electrochemical and Solid-State Letters*, 6(9)D9-D11 (2003)).

Electrochemical properties of the conductive diamond electrode vary by fluorination treatment, but the electrochemical function thereof is not impaired. Ferro et al. suggest the possibility that a life at anodic polarization of a fluorinated conductive diamond catalyst obtained by plasma fluorination treatment of a monocrystal silicon substrate-bearing conductive diamond electrode is prolonged (*Journal of Physical Chemistry B* 2003, 107, 7567-7573).

SUMMARY OF THE INVENTION

The present invention has been made, on the basis of the result by fluorination treatment of the conventional carbonaceous materials, by preventing corrosion of exposed portion of a substrate on the defective portion unavoidably generated at diamond synthesis.

Accordingly, one object of the present invention is to provide a conductive diamond electrode having high durability.

Another object of the present invention is to provide a process for producing the conductive diamond electrode.

The conductive diamond electrode according to the present invention comprises:

a conductive substrate comprising a carbonaceous material, a conductive diamond catalyst layer formed on a surface of the conductive substrate, and a carbon fluoride formed on an exposed portion present on the surface of the conductive substrate.

The process for producing the conductive diamond electrode according to the present invention comprises:

synthesizing a conductive diamond from a diamond raw material on a surface of a conductive substrate comprising a carbonaceous material, thereby covering the surface with the conductive diamond, and subjecting the conductive diamond-covered conductive substrate to fluorination treatment.

Figure 1:
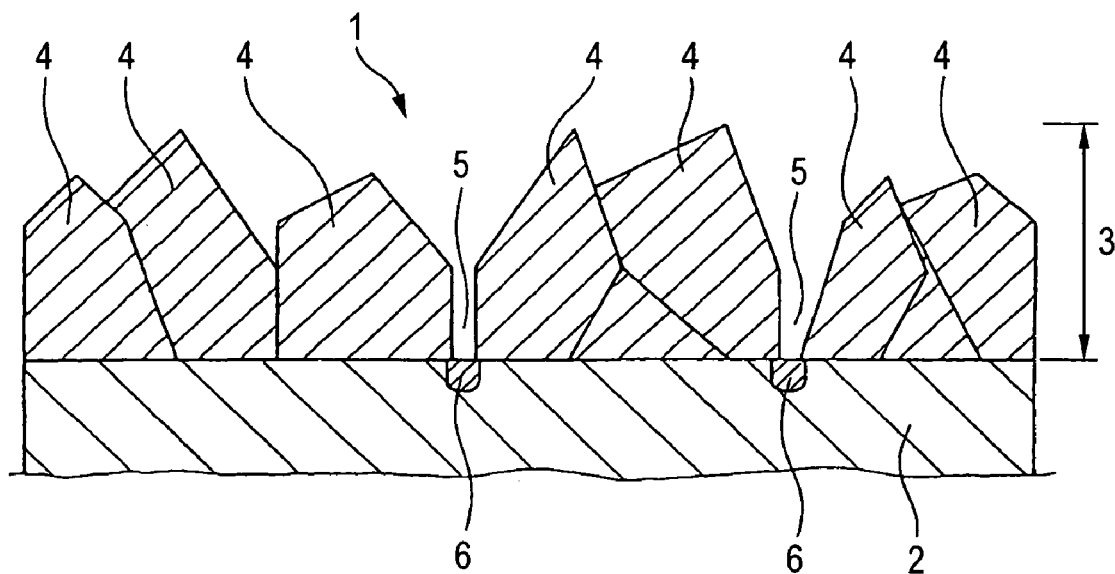
FIG. 1 is an enlarged vertically cross-sectional view showing one embodiment of the conductive diamond electrode according to the present invention.

In the drawings:
1: diamond electrode
2: carbonaceous substrate
3: conductive diamond catalyst layer
4: diamond particles
5: pinholes
6: fluorinated graphite
7: carbonaceous coating
8: conductive substrate

DETAILED DESCRIPTION OF THE INVENTION

The present invention is described in detail below.

The present invention prevents deterioration of a conductive substrate caused by defects such as pinholes on the surface of the conductive substrate by that a surface portion corresponding to the defect on the conductive substrate is fluorinated to cause resistance to an electrolytic solution. As a result, corrosion of the conductive substrate is prevented, thereby attaining a long life of an electrode.

Specifically, a conductive diamond is synthesized from a diamond raw material. On a surface of a conductive substrate comprising a carbonaceous material, thereby covering the surface with the conductive diamond particles, and the substrate is then subjected to fluorination treatment such as hot fluorination treatment or electrolytic fluorination treatment. As a result, electrolysis durability of the resulting electrode is improved. The reason for this is considered as follows. The fluorination treatment forms carbon fluoride having small surface energy, such as fluorinated graphite, on exposed substrate surface which is a defective portion unavoidably generated at diamond synthesis, this inhibits wetting between the substrate and an electrolytic solution on the surface thereof, thereby preventing corrosion of the substrate, and peeling of a diamond catalyst layer is suppressed.

It is known that when a carbonaceous material such as graphite, amorphous carbon or silicon carbide is subjected to hot fluorination treatment, electrolytic fluorination treatment or plasma fluorination treatment, carbon fluoride ($(CF)_n$ or $(C_2F)_n$) is formed by a covalent bond between carbon atom and fluorine atom in the carbonaceous material. In the present invention, the carbonaceous material on the conductive substrate surface corresponding to the defective portion of the conductive diamond catalyst layer is fluorinated to form carbon fluoride.

Fluorination treatment of the conductive diamond electrode that can be used includes hot fluorination treatment, electrolytic fluorination treatment and plasma fluorination treatment. Hot fluorination treatment and electrolytic fluorination treatment, that can treat large-sized electrodes are preferable from the standpoint that such treatments can provide a large-sized conductive diamond electrode used in an industrial electrolysis.

Fluorine source used in the hot fluorination treatment can directly use a gas such as fluorine gas, nitrogen fluoride gas or carbon fluoride gas. The gas may be diluted with an inert gas such as nitrogen, argon or helium to a concentration in a range of 1 vol % to less than 100 vol %. The gas is supplied to an object to be fluorinated, and fluorination reaction can be proceeded at a treatment temperature of 0-600° C. under a treatment pressure of 50-760 Torr.

Electrolytic bath used in the electrolytic fluorination treatment can use a molten salt bath such as KF.2HF bath. When KF.2HF is used, the electrolytic bath temperature is maintained at 70-100° C. It is known that the presence of water promotes fluorination reaction of carbon. Therefore, it is preferable to add a slight amount of water to the bath. Electrolysis is conducted using a conductive diamond electrode to be fluorinated as an anode at a current density of 1-100 $A/dm^2$ to proceed fluorination.

When the fluorination treatment is conducted, a fluorine component contacts with an exposed portion of the substrate and also the conductive diamond layer. The exposed portion of the substrate is fluorinated to convert into, for example, electrochemically inert fluorinated graphite. The surface of the conductive diamond layer is also fluorinated, but electrochemical properties of the surface are not impaired.

The conductive substrate used in the present invention is that at least the surface thereof is a carbonaceous material such as graphite, amorphous carbon, silicon carbide or the like. Such a carbonaceous material includes carbon or carbon compounds subsidiarily synthesized when synthesizing conductive diamond.

Examples of the conductive diamond synthesis method include hot filament CVD method, microwave plasma CVD method, plasma arc jet method and PVD method. The hot filament CVD method is described below as the representative conductive diamond electrode preparation method.

An organic compound such as methane, alcohol or acetone as carbon source, and at least one of boron, nitrogen, phosphorus and the like as a dopant for imparting conductivity are supplied to CVD apparatus containing therein a filament and a conductive substrate to be covered with diamond formed, together with hydrogen gas or the like. The filament is heated to a temperature of 1,800-2,800° C. at which carbon radicals, hydrogen radicals and the like generate, and the conductive substrate in the atmosphere is set to a temperature region (750-950° C.) at which diamond precipitates. In this case, the proportion of the organic compound raw material to hydrogen is preferably 0.1-10 vol %, and the content of the dopant is preferably 1-100,000 ppm, more preferably 100-10,000 ppm. Supply rate of the raw material gas varies depending on a size of a reactor. Pressure is preferably 15-760 Torr.

By conducting the CVD under those conditions, a layer of diamond fine particles having a particle diameter of generally 0.001-2 μm is deposited on the conductive substrate. Thickness of the resulting diamond catalyst layer can be controlled by the deposition time. The thickness is preferably 0.1-50 μm, more preferably 1-10 μm, for the purpose of preventing impregnation of the electrolytic solution into the electrode substrate.

Where the carbonaceous material layer is previously formed on the surface of a substrate comprising other material, CVD method or PVD method can be utilized, similar to the diamond synthesis. The formation of the carbonaceous material layer preferably uses CVD method that can form a dense and homogeneous thin film. The thin film preferably has a film thickness of 1-50 μm in order to decrease conductor resistance of the carbonaceous material layer.

The conductive diamond electrode according to the present invention can be used in water treatment, synthesis of peroxosulfuric acid, peroxocarbonic acid or the like, organic synthesis, and also electrolysis in various industries, such as brine electrolysis.

The present invention has the following advantages.

The conductive diamond is synthesized on the surface of the conductive substrate comprising a carbonaceous material, thereby covering the surface, and the substrate is then subjected to fluorination treatment. As a result, carbon fluoride is formed on an exposed portion of the substrate that is a defective portion unavoidably generated when synthesizing diamond. This carbon fluoride suppresses contact of an electrolytic solution with the substrate, thereby preventing the substrate from corrosion. This makes it possible to provide a diamond electrode for industrial electrolysis having a stable electrolysis life. Further, the present invention makes it possible to use an inexpensive carbonaceous material that could not conventionally been used as a substrate for conductive diamond electrode from the standpoint of corrosion resistance.

Figure 2:
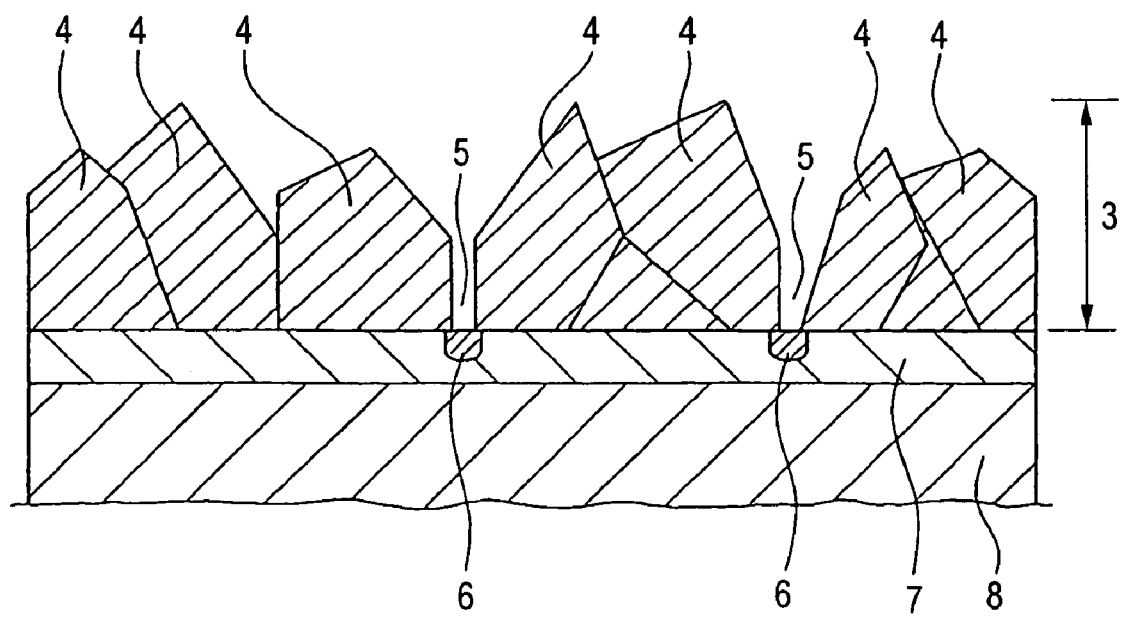
FIG. 2 is an enlarged vertically cross-sectional view showing another embodiment of the conductive diamond electrode according to the present invention.

The practical embodiments of the conductive diamond electrode and its production process according to the present invention are described by referring to FIGS. 1 and 2, but the invention is not limited to those embodiments.

FIG. 1 is an enlarged vertically cross-sectional view showing one embodiment of the conductive diamond electrode according to the present invention.

A diamond electrode 1 comprises a carbonaceous substrate 2 comprising carbon (such as graphite or amorphous carbon) or a carbon compound (such as silicon carbide) having formed on the surface thereof a conductive diamond catalyst layer 3. The conductive diamond catalyst layer 3 is formed from many diamond particles 4 synthesized from a carbon source such as alcohols using CVD method or the like.

Pinholes 5 or cracks unavoidably generate between the diamond particles 4 constituting the formed conductive diamond catalyst layer 3. When the diamond catalyst layer 3-covered conductive diamond substrate 2 is used as an electrode, an electrolytic solution permeates from pinholes 5, and contacts with the surface of the conductive substrate 2 comprising a carbonaceous material such as graphite, thereby corroding the carbonaceous material.

To prevent the corrosion, the substrate 2 is subjected to fluorination treatment. When hot fluorination treatment or electrolytic fluorination treatment is applied to the diamond catalyst layer 3 side of the substrate 2, a fluorine component having high reactivity permeates in pinholes 5 and reaches the exposed surface of the conductive substrate 2. The fluorine component reacts with a carbonaceous material, such as graphite, on the exposed surface to form fluorinated graphite on the substrate surface. Thus, all of carbons of the exposed portion on the substrate surface are converted into fluorinated graphite 6. The portion on the substrate surface, which is converted into the fluorinated graphite 6 by the fluorination treatment coincides with a portion wetted by the permeated electrolytic solution in using as an electrode. Thus, substantially all of portions that corrode with the electrolytic solution are converted into the fluorinated graphite 6 having resistance against the electrolytic solution.

Therefore, when such a substrate is used as an electrode, even if the electrolytic solution permeates from the pinholes 5, the electrolytic solution contacts with only the fluorinated graphite 6 having resistance to electrolytic solution, and does not contact with other face of the conductive substrate, which does not have resistance to electrolytic solution. As a result, the substrate 2 does not corrode, and can be used as the conductive diamond electrode 1 over a long period of time.

FIG. 2 is an enlarged vertically cross-sectional view showing another embodiment of the conductive diamond electrode according to the present invention. This embodiment is an improvement of the embodiment shown in FIG. 1. Specifically, this embodiment is that the carbonaceous substrate 2 in the embodiment shown in FIG. 1 is replaced with a conductive substrate 8 made of silicon or niobium, having formed on the surface thereof a carbonaceous coating 7.

Even in this embodiment, similar to the embodiment shown in FIG. 1, the surface of the carbonaceous coating 7 corresponding to the portion of the pinholes 5 is converted into the fluorinated graphite, thereby preventing the substrate from wetting with the electrolytic solution when using it as an electrode, and as a result, long life of electrode can be attained.

The present invention is described in more detail by reference to the following Examples, but it should be understood that the invention is not construed as being limited thereto.

EXAMPLE 1

A graphite plate was used as a conductive substrate. A conductive diamond was synthesized on the surface of the conductive substrate using a hot filament CVD apparatus under the following conditions, thereby covering the surface.

The substrate surface was abraded with an abrasive comprising fine diamond particles (3 μm diameter). The surface was activated and nucleated. The substrate thus treated was mounted on a hot CVD apparatus. Ethyl alcohol was used as a carbon source. Boron carbide was dissolved in ethyl alcohol in a concentration of 5,000 ppm, and the resulting solution was incorporated into a carbon source vessel.

Hydrogen gas was flown through the apparatus at a rate of 0.15 liter/min. Part of the hydrogen gas was by-passed into the carbon source vessel to make an ethyl alcohol concentration to hydrogen be 1 vol %. Electric current was applied to the filament while flowing those gases through the CVD apparatus, to elevate the temperature to 2,400° C. at which carbon radicals generate. The temperature of the substrate located just under the filament was measured, and was found to be 800° C. After continuing the CVD operation for 12 hours, the substrate was taken out of the apparatus. As a result of analyzing with Raman spectroscopy, it was confirmed that diamond was deposited. Further, according to SEM observation, its thickness was 5 μm.

The thus produced conductive diamond-covered substrate was subjected to fluorination treatment under the following conditions. The substrate was placed in a heating vessel made of nickel, and the inner atmosphere of the vessel was substituted with nitrogen gas for 1 hour. Fluorine gas was generated by electrolysis while supplying nitrogen gas into an anode chamber of KF.2HF molten salt electrolytic cell. The temperature of the heating vessel was maintained at 450° C. while flowing a mixed gas having a fluorine concentration of 10 vol % through the heating vessel at a rate of 60 ml/min to prepare a conductive diamond electrode. As a result of analysis of the conductive diamond after fluorination treatment, it was confirmed by SEM observation that the appearance of the diamond catalyst layer did not change before and after the fluorination treatment.

The fluorine-treated conductive diamond electrode thus produced was mounted on an electrode jig made of PFA, and an area of 0.5 cm$^2$ was exposed on the electrode to use as an anode. Electrolysis was conducted in a 3 wt % sodium fluoride electrolytic bath using the diamond electrode having the exposed portion as an anode and a zirconium plate as a counter electrode with an electrode distance of 1 cm under the conditions of 20° C. and 3 A/dm$^2$. As a result, a stable cell voltage was maintained even after passing 1,000 hours, and corrosion of the substrate or peeling of the diamond catalyst layer was not observed.

EXAMPLE 2

Electrolytic fluorination treatment of the conductive diamond-covered substrate produced in the same manner as in Example 1 was conducted under the following conditions. The substrate was mounted on the electrode jig, and was used as an anode in KF.2HF molten salt electrolytic bath having 100 ppm of pure water added thereto. A nickel plate was used as a cathode. Electrolytic fluorination treatment was conducted at a current density of 10 A/dm$^2$ for 30 minutes to obtain a conductive diamond electrode. As a result of analyzing the conductive diamond after fluorination treatment with SEM observation, it was confirmed that the appearance of the diamond catalyst layer did not change before and after the fluorination treatment. Further, as a result of conducting electrolysis in the same manner as in Example 1, a stable cell voltage was maintained even after passing 1,000 hours, and corrosion of the substrate or peeling of the diamond catalyst layer was not observed.

EXAMPLE 3

A conductive substrate was prepared by covering a surface of a graphite substrate with a silicon carbide coating having a thickness of 25 μm by CVD method. Using the conductive substrate, conductive diamond was synthesized on the surface of the substrate to cover the surface thereof under the same conditions as in Example 1. The substrate was subjected to fluorination treatment in the same manner as in Example 1, except that the temperature inside the heating vessel was 300° C., to obtain a conductive diamond electrode. Using the conductive diamond electrode, electrolysis was conducted in the same manner as in Example 1. As a result, a stable cell voltage was maintained even after passing 1,000 hours, and corrosion of the substrate or peeling of the diamond catalyst layer was not observed.

COMPARATIVE EXAMPLE 1

A conductive diamond-covered substrate was prepared in the same manner as in Example 1. This substrate was not subjected to fluorination treatment and was directly used as a conductive diamond electrode, and electrolysis was conducted in the same manner as in Example 1. As a result, the diamond catalyst layer peeled, and the substrate broke. As a result, electrolysis was impossible to conduct at 30 hours.

COMPARATIVE EXAMPLE 2

A conductive diamond-covered substrate was prepared in the same manner as in Example 3. This substrate was not subjected to fluorination treatment and was directly used as a conductive diamond electrode, and electrolysis was conducted in the same manner as in Example 1. As a result, cell voltage rose at 200 hours, and corrosion of the substrate and peeling of the diamond catalyst layer were confirmed.

It should further be apparent to those skilled in the art that various changes in form and detail of the invention as shown and described above may be made. It is intended that such changes be included within the spirit and scope of the claims appended hereto.

This application is based on Japanese Patent Application No. 2004-281887 filed Sep. 28, 2004, the disclosure of which is incorporated herein by reference in its entirety.

What is claimed is:

1. A conductive diamond electrode comprising:
   a conductive substrate comprising a carbonaceous material, wherein the carbonaceous material is at least one material selected from the group consisting of graphite and amorphous carbon,
   a conductive diamond catalyst layer formed on a surface of the conductive substrate, and
   a carbon fluoride formed on an exposed portion present on the surface of the conductive substrate, wherein the carbon fluoride comprises a covalent bond between carbon atom and fluorine atom in the carbonaceous material.

2. A process for producing the conductive diamond electrode comprising:
   synthesizing a conductive diamond from a diamond raw material on a surface of a conductive substrate comprising a carbonaceous material, thereby covering the surface with the conductive diamond, and
   subjecting the conductive diamond-covered conductive substrate to fluorination treatment, wherein the fluorination treatment is at least one selected from the group consisting of hot fluorination treatment and electrolytic fluorination treatment.

* * * * *